June 23, 1964 M. D. FLORY ETAL 3,138,049
APPARATUS FOR CUTTING SHEET OR WEB MATERIAL
Filed April 1, 1960 3 Sheets-Sheet 1
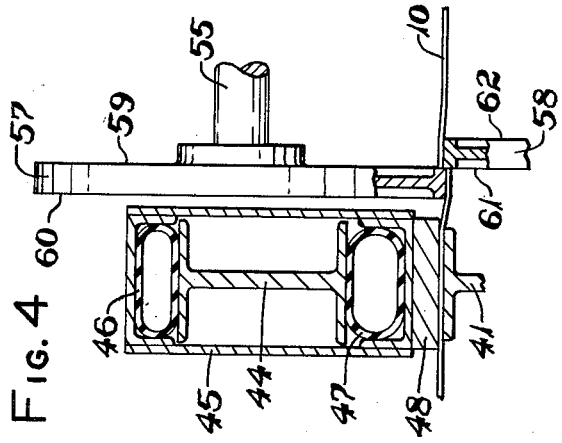
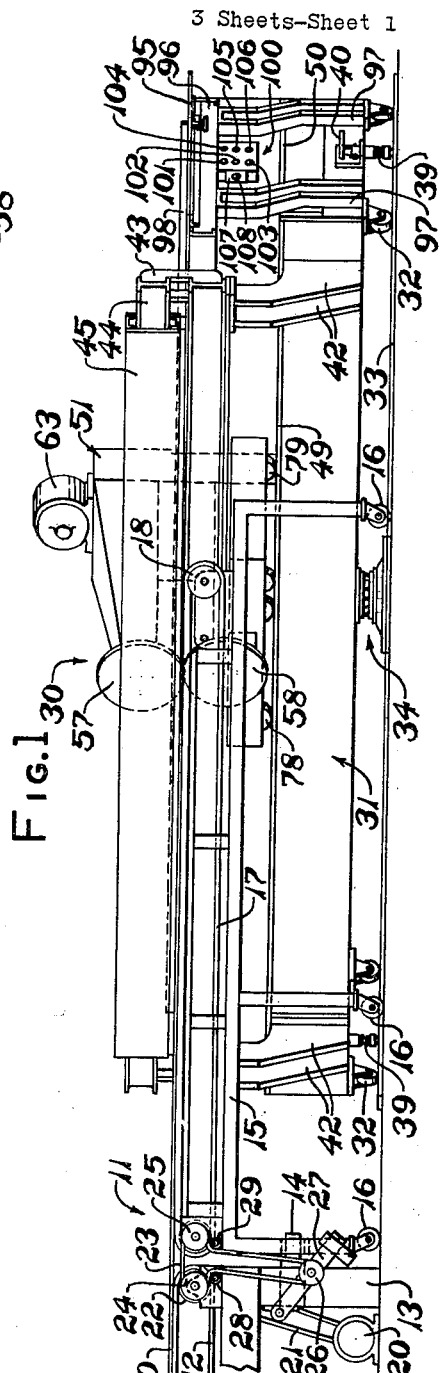
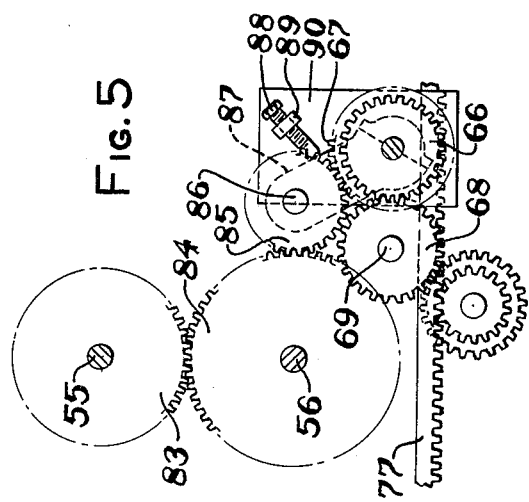
INVENTORS
MARTIN D. FLORY
BY DONALD K. PORTER
W. A. Shira Jr.
ATTY.

INVENTORS
MARTIN D. FLORY
BY DONALD K. PORTER
ATTY.

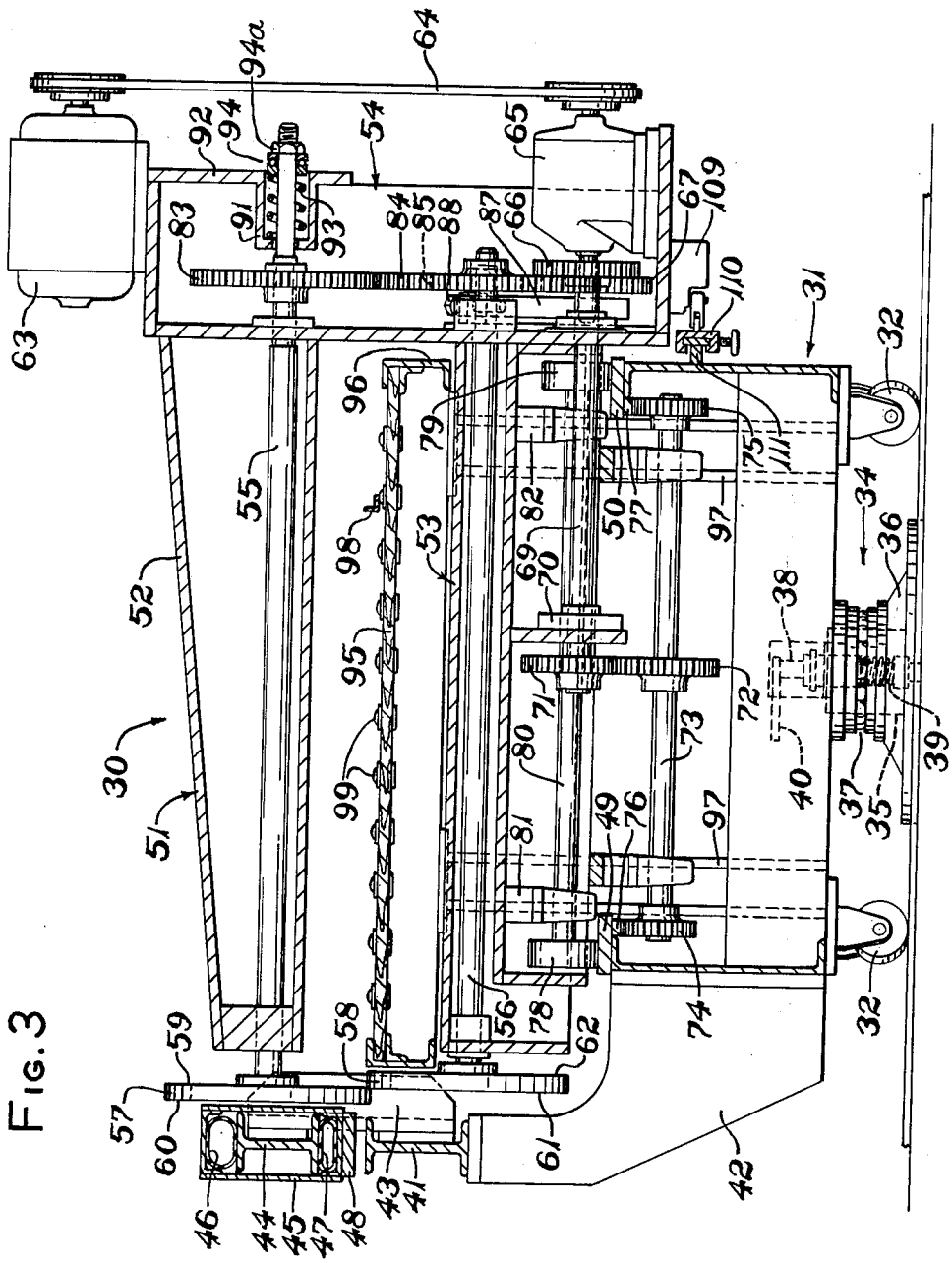

United States Patent Office 3,138,049
Patented June 23, 1964

---

3,138,049
APPARATUS FOR CUTTING SHEET OR WEB MATERIAL
Martin D. Flory, Phoenixville, Pa., and Donald K. Porter, Cuyahoga Falls, Ohio, assignors to The B. F. Goodrich Company, New York, N.Y., a corporation of New York
Filed Apr. 1, 1960, Ser. No. 19,289
4 Claims. (Cl. 83—461)

This invention relates to an apparatus for cutting sheet or web material transversely of its length and, more particularly, to an apparatus for so cutting fabric containing transversely spaced, longitudinally extending reinforcing elements of greater tenacity than the material between those elements.

Sheet or web material comprising longitudinally extending reinforcing elements covered by rubber or other elastomers, such as is employed in tires, belts and other articles of similar construction, must frequently be cut transversely of the reinforcing elements at selected angles thereto. Apparatus is available for effecting the required cutting of such material, hereinafter for convenience termed fabric, when the reinforcing elements are textile yarns or cords. However, such apparatus is not suitable for cutting fabrics of this type when the fabric is reinforced by stranded wire cords and the cutting must be effected before the rubber is cured. In such fabric the conventional severing mechanism, frequently called a bias-cutting apparatus because it is adapted to cut the fabric at bias angles, causes separation between the cords, fraying of the ends thereof, injury to the rubber, and/or a non-linear path of the cut. When fabric containing any one or a combination of these defects is used in the manufacture of tires, belts or other articles, the completed articles are generally of inferior quality if not unmarketable.

The principal object of this invention is, therefore, the provision of an improved apparatus for transversely cutting fabric of the type comprising a sheet of uncured rubber reinforced by stranded wires extending longitudinally of the fabric without injury to the rubber, excessive fraying of the ends of the wires, separation of the rubber between the wires, or non-linear path of the cut.

Another object of the invention is to provide an improved apparatus for cutting uncured rubber containing wire reinforcement members transversely of the length of those members at different predetermined angles without excessive distortion of the material or other injury thereto by virtue of employing as the cutting elements a pair of cooperating rotatable disks disposed on opposite sides of the fabric and rotated at a speed bearing a predetermined relationship to the translation of these cutters transversely of the fabric.

A more specific object of the invention is to provide an improved apparatus as defined in the preceding paragraph wherein the cutters have cooperating substantially planar faces adjacent the cutting edges so that the cutters effect a travelling rotatable shearing action upon the fabric with the cutters mounted upon a carriage transversible of the fabric by the same power means which drives the cutters so that the speed of traverse of the carriage and the speed of rotation of the cutters bear a predetermined relationship.

A still more specific object of the invention is to provide an improved apparatus as defined in the preceding paragraphs wherein means are provided for clamping the fabric to be cut adjacent the path of traverse of the cutters.

The invention further resides in certain novel features of the construction and in the combination and arrangement of the parts of the apparatus in which the invention is embodied, and further objects and advantages of the invention will be apparent to those skilled in the art to which the invention pertains from the following description of the presently preferred embodiment described with reference to the accompanying drawings, forming a part of this application, in which:

FIG. 1 is a side elevational view with the apparatus positioned to cut wire reinforced rubber fabric at an angle to its length;

FIG. 3 is an enlarged sectional view taken through the apparatus substantially on the section indicating line 3—3 of FIG. 2;

FIG. 4 is an enlarged fragmentary view showing the operation of the fabric clamping and cutting mechanisms, the clamping means being illustrated in cross section with the adjacent cutters shown partly in elevation and partly in section; and FIG. 5 is a somewhat schematic illustration of the gearing which provides rotation of the cutters and traverse of the carriage on which they are mounted.

Figure 2:
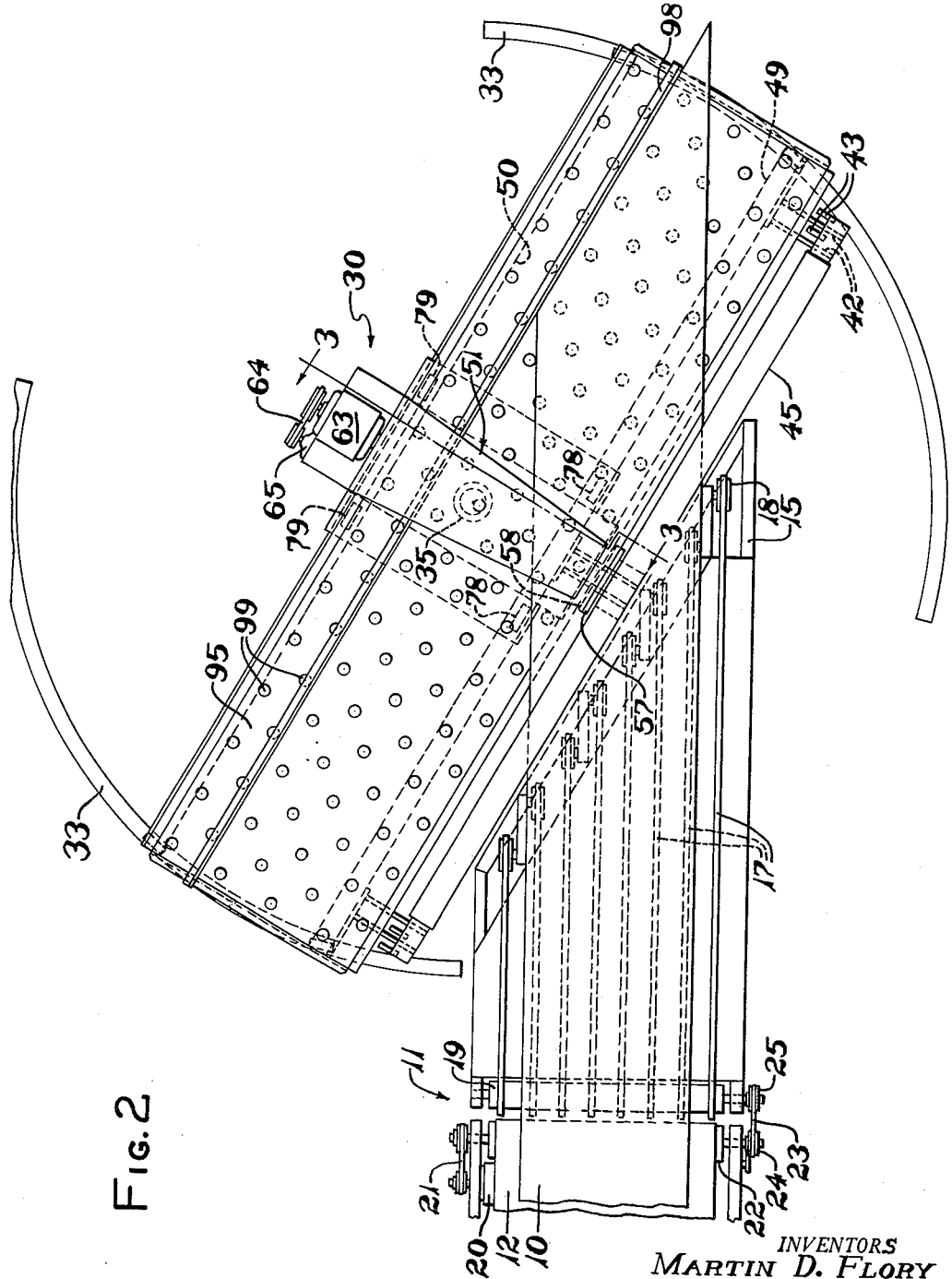
FIG. 2 is a top plan view of the apparatus shown in FIG. 1.

The invention is herein described and illustrated as it is embedded in an apparatus for severing into pieces of predetermined length fabric formed of a plurality of stranded wires extending in parallel relationship longitudinally of the fabric and united by uncured elastomeric material, such as natural or synthetic rubber or materials of similar properties. Fabric of this nature is prepared and wound into a roll with a liner disposed between the convolutions by conventional procedures and apparatus not here illustrated but which are familiar to those skilled in the art of tire and belt manufacture. A roll of such fabric 10 is supported in a suitable let-off mechanism, not shown, which provides for separation of the fabric from the liner and delivery of the fabric at a controlled rate to a conveying means for advancing the material to the cutting mechanism.

The conveying means 11 for advancing the fabric is here illustrated as comprising a belt conveyor 12 supported on a normally fixed framework 13 which is connected by disconnectible means 14 to a movable conveyor supporting frame 15. The frame 15 is mounted on wheels 16 so that, when the frame 15 is disconnected from the framework 13, the frame 15 may be moved from its illustrated position and replaced with another for a purpose which will hereinafter appear.

The frame 15 is provided adjacent the top thereof with a plurality of spaced belts 17 which are trained about suitable sheaves 18 at the forward end of the frame and a common sheave or roller 19 at the rear of the frame. As will be apparent from FIG. 2, the forward or delivery end of the frame 15 is disposed at an angle with the sheaves 18 located in horizontally staggered relationship. Hence, the belts 17 are of different lengths with the angle of the forward edge of the frame 15 being selected in accordance with the angle at which the fabric 10 is to be cut. While this angle does not need to correspond exactly with the angle to which the fabric 10 is to be severed, best results are obtained when the variation between the angle of cutting and the angle of the forward edge of the frame 15 is not of large magnitude. This can be readily achieved by providing a plurality of frames 15 having their forward edges at different angles and substituting one for the other when the angle of fabric cutting is changed by large amounts. It is for the purpose of facilitating such interchange that the frame 15 is mounted on wheels 16 and is detachably connected to the normally fixed framework 13 of the conveyor 12. The conveyor 12 and the belts 17 are simultaneously driven by a common drive comprising a reversible electric motor 20 from which a drive belt 21 extends to the head roll 22 of the conveyor belt 12. Rotation of the head roll 22 is transmitted to the belts 17 by a belt 23 trained about cooperating pulleys 24 and 25 on the rollers 22 and 19 respectively. Provision for ready disengagement of the drive from the conveyor 12 to the belts 17 is provided by training the belt 23 about a pulley 26 carried on a weighted arm 27 pivoted to the framework 13 with the belt 23 being held in engagement with the pulleys 24 and 25 by idlers 28 and 29. This construction is such that when it is desired to replace the frame 15 of the conveying mechanism with another of different forward angularity, it is only necessary to disconnect the connecting means 14 and lift the weighted arm 27. The frame 15 may then be moved from its illustrated position since there will now be sufficient slack in the belt 23 to facilitate its removal from the pulley 25. When the new frame 15 is in place, the belt 23 is readily engaged in driving relationship with the belts 17 thereof by training the belt 23 about the pulley 25 on the sheave or roller 19 and allowing the weighted arm 27 to again be supported by the belt 23.

The cutting or shearing mechanism 30 comprises a suitable base 31 of structural steel members interconnected in a generally rectangular configuration, as shown in FIGS. 2 and 3, and supported upon rollers 32 which run on segmental tracks 33 secured to the floor or other surface on which the mechanism is supported. At the mid point of the base 31 is a pivot 34 comprising a vertically extending post 35 secured to either the base 31 or a socket 36, that is fastened to the floor, with the post rotatably received in the other of these members. Intermediate the base 31 and the socket 36 and surrounding the post 35 is a suitable ball bearing assembly 37 to facilitate swinging of the cutting mechanism about the pivot. The cutting mechanism 30 may be retained in the angular position to which it is swung about its pivot by a suitable locking means here shown as comprising a plunger 38 normally urged into engagement with one of a plurality of openings in the segmental track 33 by a spring 39, the plunger being retractible by a handle attached thereto to facilitate swinging of the cutting mechanism.

The side of the base 31 for the cutting mechanism 30 adjacent the conveying means 11 is provided with an apparatus for clamping the fabric 10 to hold the same as it is being severed. In the illustrated embodiment, see FIG. 3, this comprises a lower rigid clamping member 41 in the form of an I-beam which is secured by suitable bracket members 42 to the base 31. Extending from the web of the clamping member 41, adjacent the ends of the latter, are a pair of somewhat U-shape supporting members 43, the upper portions of which are connected to the web of an upper generally horizontally extending I-beam 44 which is spaced from and aligned with the lower clamping member 41. The upper member or beam 44 is provided with a pneumatically operated movable clamping means comprising a generally rectangular shell 45 extending about the member 44 with longitudinally extending inflatable tubes 46 and 47 interposed between the upper and lower portion of the beam 44 and the adjacent upper and lower portions of the shell 45. The lower surface of the shell 45 is provided with a plate 48 of suitable material to engage and exert pressure on the fabric 10 being cut and which will readily release from that fabric in spite of the somewhat tacky nature of the latter.

The construction of the clamping means is such that, when air pressure is applied to the tube 46, the shell 45 and hence the clamping plate 48 are elevated providing a sufficient space between the plate 48 and the lower clamping member 41 to permit free passage of the fabric 10 therebetween. When the inflation air is exhausted from the tube 46, however, and air under inflating pressure is applied to the tube 47, the shell 45 moves downwardly and forces the clamping plate 48 into clamping engagement with the fabric 10 firmly holding the latter between the plate 48 and the member 41. The upper surface of the member 41 may be treated or provided with a covering member of suitable nature for ready release from the uncured rubber of the fabric 10.

The base 31 of the cutting mechanism is also provided with a pair of rails 49 and 50 which extend in spaced relationship parallel with the beams 41 and 44 of the clamping means. These rails movably support a carriage 51 that is traversible lengthwise of the rails 49 and 50, and hence tranversely of the fabric, to effect the cutting operation.

As herein shown, the carriage 51 is generally U-shape in cross section comprising elongated generally horizontally extending leg portions 52 and 53 interconnected at the ends remote from the clamping means by a generally vertically extending portion 54. This carriage is formed of a plurality of interconnected plates and suitable angle members to provide the desired rigidity with the legs 52 and 53 rotatably supporting shafts 55 and 56 the ends of which adjacent the clamping means are provided respectively with rotatable cutters 57 and 58 which are substantially disk shaped. These disk shape cutters are shown as having substantially planar side surfaces 59, 60, 61 and 62.

The diameters of the cutters, relative to the spacing between the axes of the shafts 55 and 56, is such that the adjacent planar surfaces, such as 59 and 61 of the cutters 57 and 58, are disposed in closely adjacent overlapping relationship as will be apparent from FIGS. 3 and 4 so that these cutters effect a shearing action upon the material placed therebetween as the cutters are rotated and traversed across the material. The fact that the planar surfaces on the cutters are identical on both side faces permit the cutters to be reversed upon the shafts so that the length of time between sharpening can be doubled. Moreover, this construction of the cutters faciltiates the sharpening, when necessary, since it is only necessary to grind the planar surfaces perpendicular relative to the axis of the cutter without the necessity of effecting any grinding operation upon the periphery of the cutters. Thus, the cutters can be ground independently of each other with assurance that they will properly cooperate when mounted, a condition which is difficult, if not impossible, to obtain with cutters of beveled edge type.

The vertical leg portion 54 of the carriage 39 provides a support for the carriage and cutter driving mechanism which comprises a reversible electrical motor 63 that is connected by a belt 64 to a suitable speed reducer 65. The output shaft of this speed reducer is provided with a pair of gears 66 and 67, see FIGS. 3 and 5, with the gear 66 meshing with a gear 68 that is provided on one end of a jack shaft 69. This shaft is supported by a bearing in the vertical portion 54 of the carriage housing and a bearing 70 depending from a part of the lower leg 53 of the carriage. The end of the shaft 69, remote from the gear 68, is provided with a gear 71, see FIG. 3, which meshes with a gear 72 on a shaft 73 supported by the carriage below and parallel with the shaft 69. The shaft 73 is provided adjacent its ends with rack pinions 74 and 75 which mesh with horizontally extending racks 76 and 77 secured to the under sides of the tracks 49 and 50 respectively.

The carriage is supported upon the rails 49 and 50 by rollers 78 and 79 provided on shaft 80 carried by bearings 81 and 82 depending from a portion of the lower leg 53 of the carriage 51. Suitable means, not shown, are provided to guide the carriage against movement transversely of the rails 49 and 50 during its traverse therealong. This means may comprise one or more rollers depending from the carriage 51 and engaging the side edges of the side rails 49 and 50 as will be readily understood.

The ends of the shafts 55 and 56, remote from the cutters 57 and 58, are provided within the vertical portion 54 of the carriage 51 with a pair of meshing gears 83 and 84. The gear 84 is engaged with an idler gear 85, see FIG. 5, which also meshes with the gear 67 on the shaft of the speed reducer 65. The gear 85 is journaled upon a jack shaft 86 carried by an arm 87 which is pivotally supported upon a center coinciding with the shaft for the gears 66 and 67. This facilitates replacement of the gear 85 with gears of other numbers of teeth to change the relative speed between the cutters and the carriage movement. In order to maintain the gear 85 in proper engagement with the gears with which it meshes, an adjustable stud 88 is threaded through a nut 89 carried by a fixed supporting plate 90 with the end thereof bearing against the arm 87 as will be apparent from FIG. 5.

The construction just described is such that, when the motor 63 is energized for rotation in one direction, it drives the gears 66 and 67 to effect both traverse of the carriage and rotation of the cutters. Thus, the gear 66 drives through the gears 68, 71 and 72 to cause the pinions 74 and 75 to move the carriage along the base 31 of the cutting mechanism. Simultaneously, the gear 67 drives through the gear 85 and the gears 83 and 84 to rotate the cutters. The direction of rotation of the cutters 57 and 58 corresponds with what which they would have if they simply rolled upon the fabric as the result of movement of the carriage. The surface speed of the cutters is, however, preferably not the same as the speed of translation of the carriage. Instead, the cutters preferably rotate at a faster rate than the translational speed of the carriage and it is also preferable that the upper cutter rotate faster than the lower cutter.

The following data is given by way of example of one specific embodiment which has been successfully employed, it being understood, however, that the invention is not limited to these specific gear sizes and ratios. In this embodiment, gears 66 and 68 each had sixty teeth and pitch diameters of six inches as did also gears 71 and 72. The rack pinions 74 and 75 had a pitch diameter of five inches and were each provided with fifty teeth. The gear 67 had a pitch diameter of seven inches and was provided with seventy teeth while the idler 85 had a pitch diameter of five inches and was provided with fifty teeth. The gear 84 for the lower cutter had a pitch diameter of thirteen inches and had one hundred thirty teeth while the upper cutter had a pitch diameter of eleven inches and one hundred ten teeth. The distance between centers of the shafts 55 and 56 was twelve inches and the cutters 57 and 58 had diameters slightly in excess of twelve inches each so that the adjacent side faces were in contact, as shown in FIG. 3, by an amount in the order of 1/16 inch. An apparatus provided with gears and cutters of these dimensions and driven by an appropriate electric motor 63 had a carriage surface speed of 45 feet per minute. The surface speed of the lower cutter was then 58.1 feet per minute while the speed of the upper cutter was 68.6 feet per minute. Hence, the ratio of the upper cutter speed to the horizontal travel was 23:15 while the ratio of the lower cutter speed to the horizontal travel was 19:15. An apparatus having these relative speeds satisfactorily severed stranded wire without injury to the rubber, fraying of the wire, or irregularity in the cut.

The adjacent side faces of the cutters 57 and 58 are resiliently maintained in engagement by a spring means acting axially on the shaft 55. Thus, as shown in FIG. 3, the outer end of the shaft 55 is threaded and extends, with a clearance, through a cylindrical boss 91 on a supporting plate 92 of the carriage. The inner end of this boss has a radially inwardly extending shoulder against which bears one end of a compression spring 93 with the latter surrounding the portion of shaft 55 within the boss. The other end of the spring bears against a ball thrust bearing 94 which is backed up by a nut 94a threaded on the shaft 55. Hence, the side engaging pressure of the cutters may be adjusted by varying the position of the nut 94a along the shaft 55.

The cutting mechanism is also provided with a material-receiving table 95 which extends horizontally adjacent the region of cooperation of the cutters 57 and 58. This table is supported in a suitable framework 96, generally rectangular in configuration, which is mounted upon the base 31 by brackets 97 at either end of the base with the upper and lower legs 52 and 53 of the carriage 51 extending, respectively, above and below the table. An upstanding bar or angle member 98 is preferably adjustably secured to the framework 96 for the table 95 adjacent the ends of the latter to provide an end stop or gage for the fabric being cut, see FIG. 2. This top or end gage may be set a predetermined distance from the plane of intersection of the cutters 57 and 58 to provide the desired extent of fabric which is to be severed. In order to facilitate movement of the fabric over the table into engagement with the end stop, and to permit ready removal of the cut fabric from the table, the surface of the table 95 is provided with a plurality of rotatable balls 99.

The operation of the material advancing conveyors 12 and 17, the traverse of the carriage 51, and the actuation of the fabric clamp can be effected by any suitable control instrumentalities which can be readily devised to be either automatic or semi-automatic as will be readily understood by those skilled in the art of machine design. For the sake of simplicity, the instrumentalities for controlling these operations are here shown as comprising manually operable electrical switches provided at a control panel 100 located at one end of the table 95, see FIG. 1. This control panel includes a forward start button 101 for the conveyor motor 20, a stop button 102 for that motor and a reverse start button 103 therefor. Adjacent these control buttons are a start button 104 for the carriage motor 63, a stop button 105 for that motor and a reverse start button 106 therefor. At one side of the control panel 100 is mounted a pneumatic control valve 107 which is provided with a manually operable actuator 108, such as a reciprocating rod, by which the application of fluid pressure to the inflatable tubes 46 and 47 may be sequentially controlled.

The travel of the carriage 51 is automatically stopped, after it has traversed a predetermined distance, by a limit switch in the control circuit for motor 63. Thus, a switch 109 is provided upon the lower surface of the vertical leg 54 of the carriage 51, see FIG. 3, which is actuated adjacent either end of the extent of travel of the carriage by one or the other of a pair of switch-operating cams 110 that are clamped to a bar 111 attached to and extending along the base 31. The stops 110 may be adjusted to selected positions along the bar to provide for different extents of travel of the carriage as made necessary by width of the fabric which is to be cut.

The apparatus is prepared for operation by supplying wire reinforced rubber fabric 10 from a source, not shown, to the conveyor belt 12, positioning the cutting mechanism 30 to the desired angle at which the fabric is to be cut, and locating the end gage 98 to provide the desired length for the cut pieces of fabric. The valve actuator 108 is operated to the position which supplies inflation pressure to the tube 46 thus moving the clamping means to released position. Either the forward start button 104 or the reverse start button 106 is then actuated energizing the carriage motor 63 which, through the gear reducer 65 and the gearing train shown in FIG. 5, drives the pinions 74 and 75 to move the carriage lengthwise of the base. When the carriage has reached a position adjacent either end of the base, it is automatically stopped by actuation of the limit switch 109.

With the apparatus thus initially conditioned, the operations are begun by the operator pressing the forward start switch button 101. This energizes the motor 20 which drives the conveyor belts 12 and 17 moving the fabric 10 to be cut forwardly through the space between the upper and lower members of the clamping mechanism and past the cutters 57 and 58 which are now disposed at one side of the path of travel of the fabric. When the forward edge of the fabric engages the end stop or gage bar 98, the operator actuates the stop switch button 102 thus stopping the conveyor motor 20 and hence the conveyors 12 and 17. He then actuates the valve 107, through operation of the valve actuator 108, so that fluid pressure is now supplied to the tube 47 and is exhausted from the tube 46. Hence, the clamping means is now actuated from the position shown in FIG. 3 to the clamping position as shown in FIG. 4. The operator next actuates the appropriate carriage start button 104 or 106, depending upon the position of the carriage, and the motor 63 is now energized so that the carriage is moved transversely of the strip with the cutters 57 and 58 rotating and severing the strip adjacent its clamped portion as will be apparent from the showing in FIG. 4. When the carriage 51 has completed its traverse of the fabric and has thus completely severed the protruding piece thereof, the motor 63 is stopped by actuation of the limit switch 109 whereupon the operator can manually remove the cut piece of material laterally from the table 95, this being facilitated by the balls 99

The operating cycle is repeated by actuating the valve 107 to apply fluid pressure to the tube 46 and exhaust the tube 47. This restores the clamping means to the position shown in FIG. 3. The conveyor motor 20 is again started by actuation of start switch button 101 and, when the material has been advanced to the desired extent as can be readily determined by its abutment with the end stop or gage 98, the conveyors are again stopped by actuation of switch button 102. The clamping means is now again actuated following which the carriage is again traversed across the material, moving now in the direction opposite to its previous traverse, through appropriate actuation of the start switch button 104 or 106. In the event it is desired to cut a piece of fabric to a length shorter than that for which the end gage is set, this can be readily effected, without need for readjusting the end gage, either by stopping travel of the material prior to its contact with the end gage or by allowing such contact to occur and then reversing the conveyor motor 20 through actuation of the switch button 103. This feature is of particular importance when automatic controls are provided for the apparatus such that the motor 20 is automatically stopped when the material touches the end stop or gage or has approached to within a predetermined distance thereof.

The speed of the carriage relative to the cutters can be varied by replacing the idler 85 with one of different size which will, of course, alter the surface speed of the two cutters relative to the carriage travel without altering the speed of the one cutter relative to the other. However, the relative speeds of the two cutters may be altered by changing the gears 83 and 84 which is also made possible by the provision for adjustability in the mounting for the idler 85.

The clamping means has been here shown as acting upon the fabric at only one side of the cutters. It is, of course, possible to clamp the fabric on both sides of the cutters, if this be desired. It is also possible, in some instances, to operate the mechanism without actuating the clamping means which can be effected by simply allowing the fluid pressure to remain in the tube 46 so that the clamping means remains in an inoperative position.

The above and other variations in the details of the apparatus and its mode of use, which will readily occur to those skilled in the art, are all considered as encompassed within the ambit of this invention, the scope of which is limited only as required by the appended claims.

Having thus described the invention, we claim:

1. Apparatus for transversely cutting fabric formed of a plurality of longitudinally extending stranded wires united in transversely spaced relationship by uncured rubber, said apparatus comprising:
   (a) conveying means for supporting and intermittently moving the fabric in a horizontal plane in the direction of its length,
   (b) a framework extending transversely of the path of movement of the fabric adjacent the delivery end of the conveying means,
   (c) means supporting said framework for movement about an axis extending at right angles to the plane of the conveying means to dispose said framework at a selected angle to the path of movement of the fabric,
   (d) a pair of elongated members supported on said framework so as to extend transversely of the path of movement of the fabric on opposite sides thereof with one of said members movable toward and from the other member for clamping of the fabric between said members,
   (e) means selectively operable for moving said one member to and from fabric clamping cooperation with the other of the members,
   (f) a carriage movable on said framework transversely of the path of movement of the fabric,
   (g) a pair of cooperating generally disk-shape cutters each having a smooth cylindrical periphery and planar side surfaces adjacent its periphery,
   (h) means rotatably supporting said cutters on said carriage with their axes parallel and in a common vertical plane and with the distance between their centers less than the sum of their radii, the said cutters being positioned for engagement with opposite sides of the fabric adjacent the elongated members, and
   (i) means including a motor and interconnected gearing on said carriage to move the latter and rotate said cutters in timed relation to movement of the carriage and at a peripheral surface speed of the cutters greater than the speed of the carriage, the upper of the said cutters being positioned intermediate the said elongated members and the lower of said cutters and the gearing for said cutters having ratios such that the surface speed of said upper cutter is greater than that of the said lower cutter, whereby the fabric is transversely cut during traverse of the carriage while the fabric is clamped.

2. Apparatus as defined in claim 1 wherein the said means for moving one of said clamping members to and from fabric clamping cooperation with the other of the members comprises:
   (a) fluid pressure actuated means operative to apply pressure upon said one member substantially uniformly throughout the entire clamping length of the latter, and
   (b) valve means to selectively supply fluid under pressure to said fluid pressure actuated means.

3. Apparatus as defined in claim 1 wherein the said means for moving one of said clamping members to and from fabric clamping cooperation with the other of the members comprises:
   (a) a stationary beam connected to said framework and extending parallel to said other member in vertically spaced aligned relationship therewith,
   (b) inflatable radially deformable tubes positioned on opposite sides of said beam and extending lengthwise thereof intermediate the beam and said one of the members in force transmitting relationship therewith substantially the entire clamping length of the latter, and
   (c) valve means selectively operable to apply fluid under pressure to the tubes.

4. Apparatus as defined in claim 1 wherein the said gearing comprises:
   (a) a carriage moving pinion,
   (b) a first train of gears interconnecting said motor with said pinion,
   (c) a second train of gears interconnecting said motor with said cutters, and (d) an adjustable support for one of the gears in said second train permitting substitution in said second train of gears of different sizes to thereby vary the surface speed of said cutters relative to that of the carriage.

References Cited in the file of this patent

UNITED STATES PATENTS

| | | |
|---|---|---|
| 478,023 | Rohan | June 28, 1892 |
| 493,351 | Burbank | Mar. 14, 1893 |
| 1,158,583 | Taylor | Nov. 2, 1915 |
| 1,728,163 | Maas | Sept. 10, 1929 |
| 1,898,565 | Murschauer | Feb. 21, 1933 |
| 1,937,360 | Rosener | Nov. 28, 1933 |
| 2,314,645 | Duda | Mar. 23, 1943 |
| 2,448,934 | Van Derhoef | Sept. 7, 1948 |
| 2,567,634 | Bosshard | Sept. 11, 1951 |
| 2,777,521 | Tanis | Jan. 15, 1957 |
| 2,815,007 | Pechy | Dec. 3, 1957 |
| 3,048,386 | Thumim | Aug. 7, 1962 |

FOREIGN PATENTS

| | | |
|---|---|---|
| 431,530 | Italy | May 1, 1948 |